(12) United States Patent
Weber et al.

(10) Patent No.: US 9,367,420 B2
(45) Date of Patent: Jun. 14, 2016

(54) METHOD AND ARRANGEMENT FOR MONITORING AT LEAST ONE BATTERY, BATTERY HAVING SUCH AN ARRANGEMENT, AND MOTOR VEHICLE HAVING A CORRESPONDING BATTERY

(75) Inventors: Jochen Weber, Asperg (DE); Chrysanthos Tzivanopoulos, Kornwestheim (DE); Dirk Hasenkopf, Stuttgart (DE); Stefan Butzmann, Beilstein (DE); Andreas Heyl, Ludwigsburg (DE); Frank Schindler, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 286 days.

(21) Appl. No.: 13/876,382

(22) PCT Filed: Aug. 19, 2011

(86) PCT No.: PCT/EP2011/064266
§ 371 (c)(1),
(2), (4) Date: Sep. 16, 2013

(87) PCT Pub. No.: WO2012/048929
PCT Pub. Date: Apr. 19, 2012

(65) Prior Publication Data
US 2013/0346783 A1    Dec. 26, 2013

(30) Foreign Application Priority Data
Sep. 28, 2010   (DE) .......................... 10 2010 041 492

(51) Int. Cl.
*G06F 1/26* (2006.01)
*G06F 11/30* (2006.01)
*H04Q 9/00* (2006.01)

(52) U.S. Cl.
CPC .............. *G06F 11/3058* (2013.01); *H04Q 9/00* (2013.01); *G05B 2219/24008* (2013.01); *H04Q 2209/84* (2013.01)

(58) Field of Classification Search
CPC .............................. G06F 11/3058; H04Q 9/00
USPC .......................................................... 713/300
See application file for complete search history.

(56) References Cited

U.S. PATENT DOCUMENTS 7,514,180 B2    4/2009 Li
8,219,333 B2 *  7/2012 Li .................................... 702/63

(Continued)

FOREIGN PATENT DOCUMENTS

DE    10 2005 034 118 A1    5/2006
DE    11 2004 001 276 T5    8/2007

(Continued)

OTHER PUBLICATIONS

International Search Report corresponding to PCT Application No. PCT/EP2011/064266, mailed Feb. 21, 2012 (German and English language document) (7 pages).

(Continued)

*Primary Examiner* — Vincent Tran
(74) *Attorney, Agent, or Firm* — Maginot, Moore & Beck LLP

(57) ABSTRACT

The present disclosure relates to a method and an arrangement for monitoring at least one battery, to a battery having such an arrangement, and to a motor vehicle having a corresponding battery that is used for safely monitoring the battery condition with a reduced amount of hardware. The at least one battery is monitored by analyzing measured variables of the at least one battery using at least one data processing device. The signals exchanged between the at least one battery and the at least one data processing device via a communication connection are monitored at least once.

11 Claims, 2 Drawing Sheets

(56) References Cited

U.S. PATENT DOCUMENTS

| | | | |
|---|---|---|---|
| 8,691,454 B1* | 4/2014 | Czajkowski et al. | 429/428 |
| 2001/0011845 A1* | 8/2001 | Simonelli et al. | 307/66 |
| 2006/0028210 A1 | 2/2006 | Yanagida et al. | |
| 2007/0046261 A1* | 3/2007 | Porebski | 320/132 |
| 2009/0130538 A1* | 5/2009 | Kaita et al. | 429/50 |
| 2009/0224725 A1* | 9/2009 | Tatebayashi et al. | 320/136 |
| 2010/0052614 A1* | 3/2010 | Mariels | 320/116 |
| 2011/0066309 A1* | 3/2011 | Matsuoka et al. | 701/22 |
| 2012/0004873 A1* | 1/2012 | Li | 702/63 |
| 2012/0282500 A1* | 11/2012 | Tzivanopoulos | G01R 31/3658 429/61 |

FOREIGN PATENT DOCUMENTS

| | | |
|---|---|---|
| DE | 10 2009 046 564 A1 | 5/2011 |
| EP | 0 918 363 A1 | 5/1999 |
| WO | 2010/003366 A1 | 1/2010 |

OTHER PUBLICATIONS

Krammer, et al., Improving Methods and Processes for the Development of Safety-Critical Automotive Embedded Systems, Emerging Technologies and Factory Automation (ETFA), 2010 IEEE Conference ON, IEEE, Piscataway, New Jersey, Sep. 13, 2010, XP031805276 (4 pages).

* cited by examiner

METHOD AND ARRANGEMENT FOR MONITORING AT LEAST ONE BATTERY, BATTERY HAVING SUCH AN ARRANGEMENT, AND MOTOR VEHICLE HAVING A CORRESPONDING BATTERY

This application is a 35 U.S.C. §371 National Stage Application of PCT/EP2011/064266, filed on Aug. 19, 2011, which claims the benefit of priority to Serial No. DE 10 2010 041 492.1, filed on Sep. 28, 2010 in Germany, the disclosures of which are incorporated herein by reference in their entirety.

The present disclosure relates to a method and an arrangement for monitoring at least one battery, to a battery having such an arrangement, and to a motor vehicle having a corresponding battery which, in particular, are able to be used for safely monitoring the battery state given reduced hardware outlay.

BACKGROUND

The safety functions that battery controllers need to implement are often relatively simple checks on threshold value breaches by safety-related parameters such as voltage, current and/or temperature. Such functions can easily be implemented in hardware (for example comparators). The standard safety concept for battery controllers therefore usually comprises two redundant paths—monitoring by means of hardware and monitoring by means of software. This diversified redundancy can be used to achieve an adequate measure of safety.

In contrast to battery controllers, it is known practice to provide what is known as a three-level concept for motor controllers for monitoring safety-oriented functions on a microcontroller. In this case, level 1 is the function level, level 2 is the function monitoring level and level 3 is the computer monitoring level. This concept can be used to achieve safety integrity of up to ASIL-B (ASIL=Automotive Safety Integrity Level). The three-level concept is based on a 1oo1D system (cf. FIG. 1). In such a system 100, measured variables are captured by sensors 110 which are monitored by a function computer 120. The reliability of the function computer 120 is monitored by a diagnosis unit 130. The measured variables are taken as a basis for controlling actuators 140.

In general, an MooN system is an evaluation logic unit which compares N measured values, at least M of which need to satisfy prescribed criteria (M out of N).

An MooND system is an MooN system with a self-check.

Besides Moo1D systems, there are also 1oo2D systems 200, which, by way of example, additionally involve the performance of reciprocal monitoring 150 of two function computers 120, 121 (cf. FIG. 2).

New safety standards (such as ISO 26262) place great requirements on controllers on which safety-oriented functions are carried out. The classification is provided using the "ASIL", on levels ASIL-A to ASIL-D, where ASIL-D places the greatest requirements. A high rating results in high levels of procedural outlay. In addition, more stringent requirements are placed on the verification of compliance with standard.

The conventional safety concept for battery controllers having a hardware path and a software path for the redundant monitoring of the safety-oriented variables has the following disadvantages:

Costs of the Hardware Path:

Since high voltage battery systems for automotive applications usually comprise a large number of cells (for example 400 V is attained by one hundred 4 V cells connected in series), implementation of the hardware path is costly. The reason is that the safety-oriented parameters need to be monitored individually for each cell (or each module of six cells, for example). This means that each cell (each module) requires the relevant hardware elements (for example comparators) to be installed.

Restricted Complexity of the Monitoring Functions:

Hardware elements can usually provide only simple monitoring functions (for example threshold value monitoring operations). More complex functions, for example the processing of multiple and/or dynamic signals, can be implemented only with a high level of outlay.

The publication DE 11 2004 001 276 T5 discloses a battery set charge/discharge controller in which an apparent charge state value is calculated by a controller. However, this solution has no provision for reduction of the hardware outlay for the implementation of the requisite safety functions.

SUMMARY

The disclosure proposes a method for monitoring at least one battery in which the conventionally used hardware for the redundant monitoring of safety-oriented variables, that is to say what is known as the hardware path, is dispensed with. The method according to the disclosure involves at least one data processing device evaluating measured variables, such as voltage, temperature or the like, for the at least one battery. The battery may be a battery which comprises a multiplicity of electrochemical cells which are connected in series. In this case, provision may be made for a number of individual cells, for example six cells, again to be combined to form a module for the purpose of evaluating safety-oriented measured variables. The data processing device may be a microcontroller, a programmable chip, a programmable processor, a programmable logic unit or the like; in general terms, it may be a programmable data processing device on which the safety functions are implemented by software (computer programs). In order to safely ensure the dependability of the battery even in the absence of a hardware path, the disclosure also provides for the communication link between the at least one battery and the at least one data processing device to be monitored. In one preferred embodiment of the disclosure, the signals are transmitted from the at least one battery, the modules or the cells of the battery, to the at least one data processing device via a single-channel communication link. In one preferred embodiment of the disclosure, the measured variables from the cells are read in by at least one measurement chip—such as an analogue-digital converter or a sensor—arranged in the single-channel communication link, are digitized and are forwarded to the at least one data processing device.

Preferably, the monitoring comprises at least the checking of communication links and/or of components within the communication link(s), such as of sensors for capturing the measured variables, of measurement chips or the like, and/or the at least one data processing device, or the checking of the correctness or plausibility of the signals interchanged via the communication link(s).

It is found to be advantageous if the communication link between the battery, the modules or the cells of the battery and the at least one data processing device is monitored for freedom of error. This monitoring can also relate to individual subsections of the communication link. By way of example, it is thus possible for subsections of the communication link to be monitored independently of one another. Preferably, however, the monitoring covers all subsections of the communication link. As one subsection, it is possible for the connection between the battery, the modules or the cells of the battery and a measurement chip to be monitored, for example. The monitoring can detect short circuits, connections to voltages, open lines or the like, in particular. In one preferred embodiment of the disclosure, at least some of the monitoring is carried out by elements which are arranged in the communication link, such as measurement chips, and/or by the at least one data processing device.

In one preferred embodiment, provision is also made for at least some, but preferably all, of the signals interchanged between the battery, the modules or the cells of the battery and the at least one data processing device to be monitored for errors. In particular, provision may be made for the plausibility of the signals to be checked. The monitoring is preferably performed in redundant fashion. In one preferred embodiment of the disclosure, at least the freedom from error or the plausibility of the voltage, temperature and/or current measured values is checked. It is found to be advantageous if, for the purpose of monitoring the voltage measured values, for example, not only the voltage measured values from the individual cells but also the voltage measured values from modules of successive cells are evaluated. Comparison of the voltage measured values from the individual cells of a module with the voltage measured value from the whole module then infers the plausibility of the voltage measured values.

In another preferred embodiment, the temperature measured values are captured by using at least two temperature sensors for the plausibility check for each physically separable unit. In the case of units having a high level of thermal coupling, these two temperature sensors may even suffice for the whole thermally coupled system. In such cases, it is not necessary to provide two temperature sensors for each physically separable unit, e.g. for each battery cell.

In one preferred embodiment, the monitoring of the current measured values also involves the use of at least two current sensors, preferably of diversified design.

For the purpose of monitoring the communication link between components arranged in the communication link and the at least one data processing device, one preferred embodiment has provision for this communication link to be monitored by at least one check signal. Preferably, a defined check signal is output by the components arranged in the communication link and is evaluated by the at least one data processing device. It is found to be advantageous to use a dynamic check signal.

The check signal can also be used to check components, e.g. an analogue-to-digital converter. The check is preferably performed using a dynamic test signal having two voltage levels ($V_{High}$, $V_{Low}$).

It is also found to be advantageous if the monitoring is implemented redundantly by means of diversified measures. In this case, various methods and/or algorithms can be provided for the purpose of monitoring signals or the operating state of components, such as the battery, of modules or cells of the battery, of the at least one data processing device, of further components, such as measurement chips within the communication link or the like. It is found to be particularly advantageous that this approach meets specific safety requirements, such as in the case of an ASIL decomposition. The safety functions of diversified design allow various safety requirements to be met. By way of example, a first safety function can thus meet requirements from ASIL-A and a safety function of diversified design can meet requirements from ASIL-B. Furthermore, provision may be made for at least some of the safety functions to be safeguarded by a three-level safety concept. Provision may also be made for diversified safety functions to monitor one another, for example by means of challenge-response communication.

In one preferred embodiment of the disclosure, the diversified measures are implemented on a data processing device. However, it may be found to be advantageous if at least two data processing devices are provided which each have the safety functions implemented on them in diversified fashion. The at least two data processing devices may then be connected up in series and/or parallel. In this case, all of the monitoring measures described in the last paragraph can be performed by the at least two data processing devices, for example ASIL-A on a first data processing device and ASIL-B on a second data processing device, or the challenge-response communication takes place between different data processing devices.

The use of at least two data processing devices significantly reduces the outlay for the software processes (ISO 26262) and the diagnosis coverage measures (ISO 262626-5, Annex D) in comparison with the embodiment in which just one data processing device is used.

An arrangement according to the disclosure has at least one data processing device, such as a microcontroller, a chip and/or processor, and is set up such that a method for monitoring at least one battery can be carried out, wherein measured variables from at least one of the at least one battery are evaluated by the at least one data processing device, and wherein at least one monitoring operation is performed on signals interchanged via a communication link between the at least one battery and the at least one data processing device.

A further aspect of the disclosure relates to a battery having an arrangement for monitoring the battery, wherein the arrangement is set up such that a method for monitoring the battery can be carried out, wherein measured variables from at least one of the at least one battery are evaluated by at least one data processing device, and wherein at least one monitoring operation is performed on signals interchanged via a communication link between the at least one battery and the at least one data processing device. Preferably, the battery is a lithium-ion battery or the battery comprises electrochemical cells which are in the form of lithium-ion battery cells.

Another aspect of the disclosure relates to a motor vehicle having an electric drive motor for driving the motor vehicle and a battery that is or can be connected to the electric drive motor in accordance with the aspect of the disclosure described in the preceding paragraph. The battery is not restricted to such a purpose of use, however, but can also be used in other electrical systems.

A computer program for monitoring at least one battery allows a data processing device, after said program has been loaded into memory means of the data processing device, to perform a method for battery monitoring, wherein measured variables from at least one of the at least one battery are evaluated by at least one data processing device, and wherein at least one monitoring operation is performed on signals interchanged via a communication link between the at least one battery and the at least one data processing device.

In a further preferred embodiment of the disclosure, the computer program according to the disclosure is of modular design, with individual modules being installed on different portions of the data processing device.

Advantageous embodiments additionally comprise computer programs which can carry out further method steps or method cycles which are indicated in the description.

In order to perform the method according to the disclosure for monitoring at least one battery, a computer-readable storage medium can be used which stores a program which allows a data processing device, after said program has been loaded into memory means of the data processing device, to perform a method for battery monitoring, wherein measured variables from at least one of the at least one battery are evaluated by at least one data processing device, and wherein at least one monitoring operation is performed on signals interchanged via a communication link between the at least one battery and the at least one data processing device.

The safety architecture according to the disclosure achieves a high level of safety without a hardware path. This is achieved particularly by comprehensive safety mechanisms for safeguarding the signal path,
in one preferred embodiment, by a second microcontroller, and/or
by suitable signal routing from the cell parameters to the safety functions/logic units.

In this case, the architecture has the following advantages, in particular:

economization on hardware elements in the sensor system and in the logic unit,
achievement of the safety integrity based on ISO 26262 with less procedural outlay than for a system having just one microcontroller,
implementability of complex safety functions with a high level of safety integrity,
implementability of safety functions with less restriction on the availability of the system,
implementability of a distributed concept.

BRIEF DESCRIPTION OF THE DRAWINGS

Exemplary embodiments of the disclosure are explained in more detail with reference to the description which follows and the drawings, in which.

DETAILED DESCRIPTION

Figure 1:
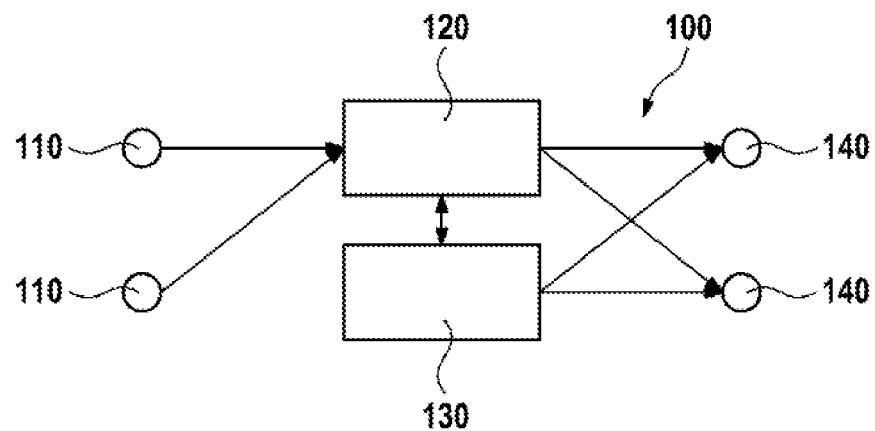
FIG. 1 shows an illustration of a 1oo1D system for a three-level safety concept.
Figure 2:
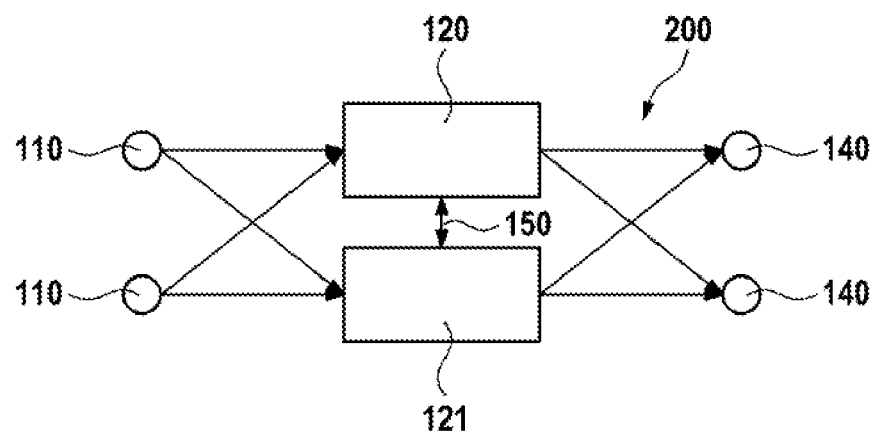
FIG. 2 shows an illustration of a 1oo2D system for a three-level safety concept.
Figure 3:
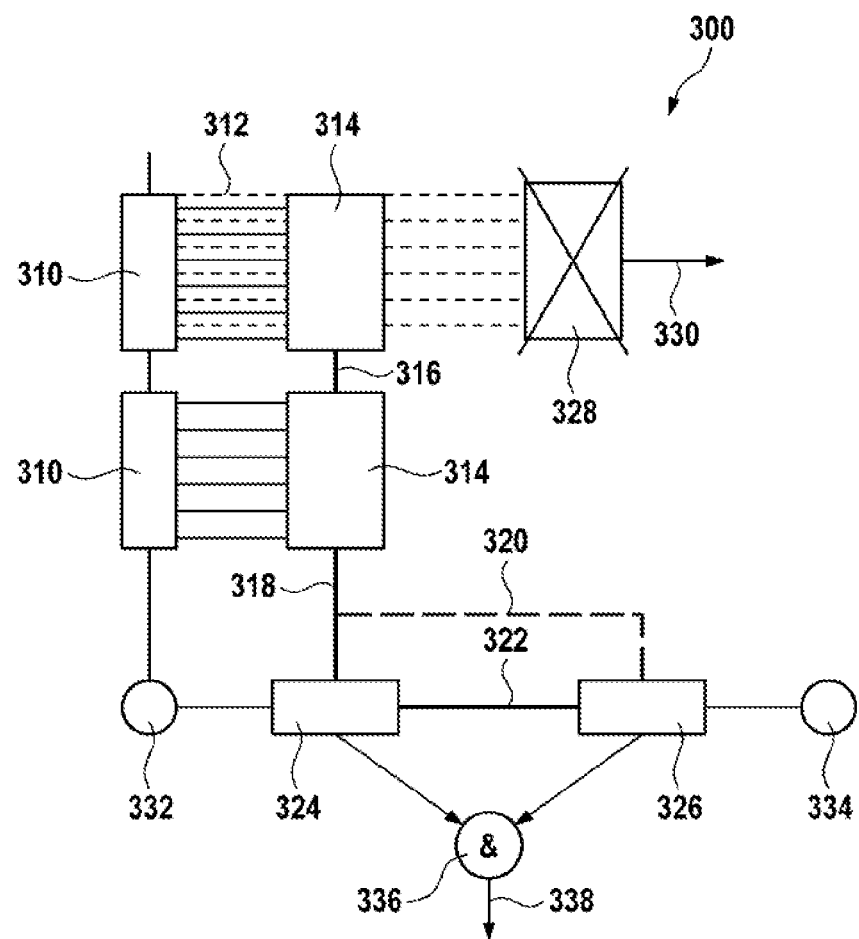
FIG. 3 shows a schematic illustration of an exemplary software-monitoring-based battery controller architecture.

FIG. 3 shows an exemplary architecture 300 for a software-monitoring-based battery controller architecture. Although the disclosure is described using an exemplary embodiment in which two microcontrollers 324, 326 are used, embodiments with just one microcontroller or with more than two microcontrollers are also conceivable. The disclosure is therefore not restricted to embodiments having two microcontrollers 324, 326, but rather also comprises other embodiments.

The safety chain of the battery controller architecture 300
Sensor System

The measured variables 312 (such as voltage and/or temperature) from the cells are read in by measurement chips 314 (for example analogue-to-digital converters), digitized and transmitted to the logic units 324, 326 via buses 316, 318, 320, 322 on request. In one exemplary embodiment, six respective electrochemical cells of the battery are combined in one module 310.

If it is now possible to monitor these signals via the single-channel path with sufficient accuracy and safety (as described in more detail further below in the section "safeguard measures for the cell signals"), no further measurement units are required for the monitoring by a hardware circuit 328 on a redundant disconnection path 330 (hardware path)—this results in economies for the hardware outlays. The hardware path 328, 330 is not present in the case of the disclosure.

Logic Unit

The measured variables 312 are evaluated in one or two microcontrollers 324, 326, which means that the hardware path 328, 330 can be dispensed with. This results—particularly in the case of the large number of signals to be monitored—in economies in the hardware, since in this case every single signal would require the installation of hardware elements, whereas a microcontroller can process a multiplicity of signals.

The use of a second microcontroller 326 affords the advantage that, on the basis of ISO 26262-9, clause 5, an ASIL decomposition can be performed. This results in the requirements (ASIL) being able to be split over the two paths 318, 320 or logic units 324, 326 and hence in the requirements placed on every single element, for example the process outlays for implementing the respective software, being reduced—this results in economies for the software outlays.

In order to achieve an ASIL-C in this case, the paths 318, 320 can be split into ASIL-B and ASIL-A. The ASIL-B can then be implemented by means of a microcontroller 324 with the known three-level safety concept, possibly by reusing tried-and-tested software modules. For ASIL-A, it is then necessary to implement only a reduced set of requirements from ISO 26262 on the second microcontroller 326.

For an ASIL-D, the second microcontroller 326 could also be safeguarded using the three-level concept based on ASIL-B. However, this might then entail further requirements placed on the single-channel component (signal measurement) of the safety chain.

So that the independence of the two monitoring operations is assured for the ASIL decomposition, the safety functions in the two microcontrollers 324, 326 need to be implemented in diversified fashion, for example by different algorithms or by using fixed and floating point numbers.

When both microcontrollers 324, 326 receive a current measurement signal 332, 334—via a direct connection or via a bus—it is possible for all three important battery parameters (voltage, temperature, current) to be monitored by both microcontrollers 324, 326.

Both microcontrollers 324, 326 can use the connecting bus 320, 322 also to monitor one another, for example by means of challenge-response communication (ISO 26262-5, Table D.4: "reciprocal comparison by software"; 1oo2D system).

Both microcontrollers 324, 326 can be connected in series, for example by a bus 322 for the series circuit, so that the first microcontroller 324, which is on the high-voltage side, for example, polls the sensor signals and immediately forwards them to the second microcontroller 326. It is thus possible to economize on further hardware elements (insulators). So that this single-channel feature is sufficiently reliable and cannot be impaired by single errors, for example in the first microcontroller 324, the signal path also needs to be safeguarded by additional diagnosis measures, however (as described in the section "signal path safeguard and vitality check" further below).

Actuator System

The use of two microcontrollers 324, 326 affords the advantage that it is also possible for the actuator system to be controlled by two diversified controls 336 in the case of error (ISO 26262-5, Table D.2; "voter"). The actuator system itself likewise needs to be of a redundant design (at least two main contactors through a redundant disconnection path 338).

Safeguard Measures for the Cell Signals
Cell Connections for the Voltage Measurement Various errors may be present at the connection between the cells and the analogue-to-digital converters 314. Short circuits and connections to voltages can be spotted by means of out-of-range diagnoses. An open circuit needs to be spotted by means of further diagnosis measures. Some measurement chips/analogue-to-digital converters 314 afford this type of diagnosis.

Redundancy of the Voltage Measurement

The redundancy allows plausibility checks to be performed on the voltage signals (see ISO 26262-5; Table D.11 "reference sensor"). In the proposed architecture 300, this redundancy is provided not by means of measurement lines of dual design for the cells, but rather by means of additional reading-in of "module voltages", that is to say the voltage from six successive cells of a module 310. Summation of the cell voltages and comparison with the module voltage can be used to perform a sufficiently accurate plausibility check on the measured values.

Redundancy of the Temperature Measurement

The temperature signals are also checked for plausibility by means of redundancy (see ISO 26262-5, Table D.11 "input comparison"). For this, the proposed architecture 300 contains two temperature sensors for each physically separable unit. The transport of heat between the measurement points produces redundant values.

Signal Path Safeguard and Vitality Check

The operability of the analogue-to-digital converters 314 and also the bus connection 316, 318, 320 from the measurement units to the logic units is checked by reading in, transmitting and evaluating a dynamic signal (see ISO 26262-5, Table D.11 "test pattern"). For this purpose, an alternating voltage (for example a square-wave signal) having a known dynamic range and known upper and lower values is assigned to one input of each of the analogue-to-digital converters 314, transmitted via the buses 316, 318, 320 and evaluated in the logic units 324, 326. The logic units 324, 326 can detect discrepancies and hence rate the signal path as unreliable or request the safe state.

In the proposed architecture 300, this signal is produced by an oscillator each time. Since the values of the test voltages are known, this mechanism is also used to monitor the bus 316, 318, 320 between the measurement units 314 and the logic units 324, 326 (instead of standard CAN monitoring using a CRC checksum, for example).

Redundancy of the Current Measurement

Each of the microcontrollers 324, 326 is provided with a current measured value 332, 334 by one of two current sensors—which are preferably of diversified design. The second value 334, 332 is transmitted via a bus 322 by the respective other microcontroller so that each logic unit 324, 326 can check the plausibility of the current value (see ISO 26262-5, Table D.11 "input comparison").

If one of the microcontrollers 324, 326 is positioned on the high-voltage side, it is possible to save on hardware outlay in this case, since no insulator is required.

Flexibility through Software

The use of a programmable logic unit in the single-channel path (instead of an additional hardware circuit, as customary to date) allows the signals to be monitored using more complex safety functions. By way of example, it became apparent for various cells that a simple upper threshold is insufficient for the current, but instead the current integral needs to be monitored, for example. The use of software paths allows safety to be improved.

More complex safety functions can prevent unnecessary addition of the monitoring, on the other hand. If safety would not be jeopardized on the basis of further influencing variables (for example a low temperature), for example, despite the rupture of some limit thresholds, a less flexible safety function (for example implemented in hardware) would not be capable of allowing for this condition. The use of software paths allows availability to be improved.

The embodiment of the disclosure is not limited to the preferred exemplary embodiments specified above. On the contrary, a number of variants are conceivable which make use of the method according to the disclosure, the arrangement according to the disclosure, the battery according to the disclosure and the motor vehicle according to the disclosure even in the case of fundamentally different types of embodiments.

The invention claimed is:

1. A method for monitoring a plurality of battery modules of a battery with at least two data processing devices, comprising:

measuring variables from each battery module of the plurality of battery modules with a plurality of sensors, each sensor of the plurality of sensors being connected to the at least two data processing devices via a communication link;

evaluating the measured variables with the each of the at least two data processing devices, the evaluating being performed by each of the at least two data processing devices redundantly and simultaneously;

monitoring signals interchanged via the communication link for errors using the at least two data processing devices, the monitoring being performed by each of the at least two data processing devices redundantly and simultaneously; and monitoring one of the at least two data processing devices with another of the at least two data processing devices.

2. The method as claimed in claim 1, the monitoring of the signals comprising:

performing a first monitoring operation on connections between the battery modules and the plurality of sensors;

performing a second monitoring operation on connections between the plurality of sensors and the at least two data processing devices;

performing a third monitoring operation on the plurality of sensors; and performing a fourth monitoring operation on the signals interchanged via the communication link.

3. The method as claimed in claim 1, the monitoring of the signals comprising:

generating a check signal with at least one battery module of the plurality of battery modules arranged in the communication link; and performing a plausibility check on at least some of the signals interchanged via the communication link by evaluating the check signal with each of the at least two data processing devices.

4. The method as claimed in claim 1, the evaluating of the measured variables further comprising:

evaluating at least some of the measured variables using one of the at least two data processing devices and using a first method; and evaluating at least some of the measured variables using another of the at least two data processing devices and using a second method.

5. The method of claim 3, the plausibility check further comprising:

measuring a first voltage from a first battery module in the battery with a first voltage sensor, the first battery module including a plurality of battery cells;

measuring a second voltage from each battery cell in the plurality of battery cells of the first battery module with a second voltage sensor;

receiving with the at least two data processing devices the first voltage measurement from the first voltage sensor and each of the second voltage measurements from the second voltage sensor via the communication link; and performing with the at least two data processing devices the plausibility check to identify that a difference between the first voltage measurement and a sum of the second voltage measurements received via the communication link are within a predetermined tolerance.

6. The method of claim 3, wherein the check signal has a predetermined dynamic range.

7. The method of claim 6, wherein the check signal is an alternating signal that alternates between a predetermined high voltage and a predetermined low voltage.

8. The method of claim 7, wherein the check signal is a square wave.

9. An arrangement comprising:
a plurality of sensors configured to measure variables from a plurality of battery modules of a battery; and
at least two data processing devices connected to the plurality of sensors via a communication link;
wherein the arrangement is configured to:
measure variables from each battery module of the plurality of battery modules with the plurality of sensors;
evaluate the measured variables with each of the at least two data processing devices, the evaluating being performed by each of the at least two data processing devices redundantly and simultaneously;
monitor signals interchanged via the communication link for errors using the at least two data processing devices, the monitoring being performed by each of the at least two data processing devices redundantly and simultaneously; and
monitor one of the at least two data processing devices with another of the at least two data processing devices.

10. A battery comprising:
an arrangement including a plurality of sensors configured to measure variables from a plurality of battery modules of the battery, and at least two data processing devices connected to the plurality of sensors via a communication link, the arrangement being configured to:
measure variables from each battery module of the plurality of battery modules with the plurality of sensors;
evaluate the measured variables with each of the at least two data processing devices, the evaluating being performed by each of the at least two data processing devices redundantly and simultaneously;
monitor signals interchanged via the communication link for errors using the at least two data processing devices, the monitoring being performed by each of the at least two data processing devices redundantly and simultaneously; and
monitor one of the at least two data processing devices with another of the at least two data processing devices.

11. The battery as claimed in claim 10, wherein:
the battery is included in a motor vehicle having an electric drive motor configured to drive the motor vehicle, and
the battery is connected to the electric drive motor.

* * * * *